Patented Jan. 10, 1950

2,494,458

UNITED STATES PATENT OFFICE 2,494,458

DIALKYLAMINO ALKYL PIPERATE AND ITS HYDROCHLORIDE

Martin E. Synerholm, Hastings on Hudson, N. Y., assignor to Boyce Thompson Institute for Plant Research, Inc., a corporation of New York No Drawing. Application March 22, 1947, Serial No. 736,591

1 Claim. (Cl. 260—338)

This invention relates to organic chemistry and has for its object the provision of organic compounds. More particularly, the invention is concerned with the provision of a dialkylamino alkyl piperate and its hydrochloride. The new compounds of the invention are characterized by being non-toxic and having the power of producing local anaesthesia, and the hydrochloride, being highly soluble in water, is especially effective for this purpose. The compounds of the invention are less toxic than cocaine and novocaine and are at least as effective as local anaesthetics.

The piperate of my invention may be represented by the formula

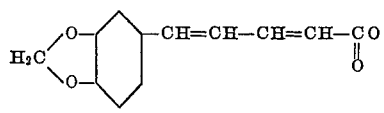

and the hydrochloride thereof by the formula

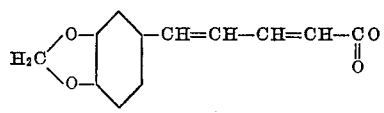

The preparation of the piperate of the invention will be described in connection with the preparation of diethylaminobutyl piperate which is prepared by esterifying piperic acid with diethylaminobutyl alcohol. Piperic acid is obtained by refluxing for 6 hours 200 g. of piperine in 1200 ml. of 20 per cent alcoholic potassium hydroxide. One cooling, the solid potassium piperate is filtered, washed with alcohol and taken up in water. The acid is liberated by acidification with dilute mineral acid, e. g., sulfuric acid, filtered and washed with water then with 95 per cent alcohol to facilitate drying.

Twenty-two grams (0.1 mole) of the dried piperic acid is suspended in 100 ml. of dry benzene. Twenty grams of thionyl chloride are added and the mixture is warmed on the steam bath until all of the piperic acid has reacted as shown by the formation of a clear solution and by the fact that hydrogen chloride is no longer evolved. The mixture is cooled and an equal volume of petrolum ether is added. The precipitated piperic acid chloride is filtered and washed with petroleum ether.

Twenty-three and seven-tenths grams (0.1 mole) of piperic acid chloride and 15 grams of diethylaminobutyl alcohol are mixed in 100 ml. of benzene. The mixture is warmed on the steam bath for one hour and cooled. Dry hydrogen chloride is passed in with cooling. The hydrochloride of the β-diethyl aminobutylpiperate is filtered and recrystallized from absolute alcohol. The pure ester hydrochloride melts at 161° to 162° C. The hydrochloride is water soluble and may be boiled in aqueous solution without decomposition.

Tests have indicated that these compounds are much less toxic toward mice when injected intraperitioneally than either novocaine (p-aminobenzoyldiethyl-aminoethanol hydrochloride) or cocaine which are commonly used as local anaesthetics. They are more than two and one-half times are effective as cocaine in the desensitization of the cornea of the eye of a guinea pig. I have also found that these compounds are effective when placed upon the tip of the tongue in desensitizing this area. The compounds are of the same order of effectiveness as cocaine in the eviscerated frog test.

I claim:

A compound of the group represented by the formulae consisting of

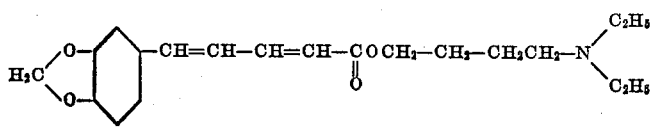

and

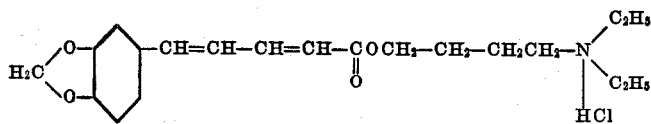

MARTIN E. SYNERHOLM.

(References on following page)

REFERENCES CITED

The following references are of record in the file of this patent:

UNITED STATES PATENTS

| Number | Name | Date |
|---|---|---|
| 2,103,265 | Lott | Dec. 28, 1937 |
| 2,251,946 | Lott | Aug. 12, 1941 |
| 2,442,555 | Synerholm | June 1, 1948 |

OTHER REFERENCES

Harvill et al., Contrib. Boyce Thompson Instit., April–June (1943), pages 87 to 92.